(12) United States Patent
Mitsutani

(10) Patent No.: US 7,952,236 B2
(45) Date of Patent: May 31, 2011

(54) CONTROL APPARATUS FOR LOAD DEVICE, AND VEHICLE

(75) Inventor: Noritake Mitsutani, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 127 days.

(21) Appl. No.: 12/312,290

(22) PCT Filed: Dec. 13, 2007

(86) PCT No.: PCT/JP2007/074476
§ 371 (c)(1),
(2), (4) Date: May 4, 2009

(87) PCT Pub. No.: WO2008/081722
PCT Pub. Date: Jul. 10, 2008

(65) Prior Publication Data
US 2010/0045103 A1 Feb. 25, 2010

(30) Foreign Application Priority Data

Jan. 4, 2007 (JP) ................................. 2007-000110

(51) Int. Cl.
B60L 1/00 (2006.01)
(52) U.S. Cl. .......................... 307/117; 307/9.1; 307/10.1
(58) Field of Classification Search ................... 307/9.1, 307/10.1, 117
See application file for complete search history.

(56) References Cited

U.S. PATENT DOCUMENTS

| 5,400,236 A | 3/1995 | Shimizu et al. |
| 5,923,135 A * | 7/1999 | Takeda .......................... 318/432 |
| 6,563,288 B2 * | 5/2003 | Ueno et al. .................... 318/783 |
| 6,854,881 B2 * | 2/2005 | Nada ............................. 374/169 |
| 7,038,415 B2 * | 5/2006 | Nakamura et al. ............ 318/471 |
| 2004/0124808 A1 * | 7/2004 | Hirono .......................... 318/806 |
| 2008/0212345 A1 * | 9/2008 | Yamashita et al. ............. 363/50 |
| 2009/0108794 A1 * | 4/2009 | Ochiai et al. .................. 318/760 |

FOREIGN PATENT DOCUMENTS

| JP | A-4-145802 | 5/1992 |
| JP | A-05-015068 | 1/1993 |
| JP | A-8-126101 | 5/1996 |
| JP | A-9-275674 | 10/1997 |
| JP | A-11-113163 | 4/1999 |

(Continued)

OTHER PUBLICATIONS

Oct. 12, 2010 Office Action issued in Japanese Patent Application No. 2007-000110 (with translation).

Primary Examiner — Jared J Fureman
Assistant Examiner — Adi Amrany
(74) Attorney, Agent, or Firm — Oliff & Berridge, PLC

(57) ABSTRACT

A control apparatus for a load device mounted on a vehicle is provided with: a temperature sensor detecting a temperature of an inverter; a voltage sensor detecting an applied voltage of the inverter; and a control unit operating the inverter in a case where the applied voltage is a predetermined upper limit value or lower whereas stopping the inverter in a case where the applied voltage is higher than the upper limit value based on a voltage detection result by the voltage sensor. The control unit sets the upper limit value based on temperature dependency of a withstand voltage of an IGBT element included in the inverter and a temperature detection result by the temperature sensor.

12 Claims, 12 Drawing Sheets

FOREIGN PATENT DOCUMENTS

| | | |
|---|---|---|
| JP | A-2001-169407 | 6/2001 |
| JP | A-2004-166341 | 6/2004 |
| JP | A-2004-180466 | 6/2004 |
| JP | A-2005-045927 | 2/2005 |
| JP | A-2005-348510 | 12/2005 |
| JP | A-2006-81350 | 3/2006 |
| JP | 2007143293 A * | 6/2007 |
| JP | A-2007-306640 | 11/2007 |

* cited by examiner

FIG.2

CONTROL APPARATUS FOR LOAD DEVICE, AND VEHICLE

TECHNICAL FIELD

The present invention relates to a control apparatus for a load device, and a vehicle and, more particularly, to a control apparatus for a load device provided with an inverter, capable of protecting the inverter from an overvoltage in the load device, and a vehicle provided with the control apparatus.

BACKGROUND ART

In recent years, attention has focused on a hybrid vehicle and an electric vehicle as environmentally friendly automobiles. A hybrid vehicle is an automobile that uses a motor to be driven by a DC power source via an inverter as a power source in addition to a conventional engine. Specifically, the power source is secured by driving the engine, and further, a DC voltage supplied from the DC power source is converted into an AC voltage by the inverter, and then, another power source is secured by rotating the motor at the converted AC voltage.

In contrast, the electric vehicle is an automobile that uses a motor to be driven by a DC power source via an inverter as a power source.

Most of the above-described automobiles are provided with a device for protecting the inverter for driving the motor. Japanese Patent Laying-Open No. 5-15068, for example, discloses an inverter type power source device including a DC power source circuit; an inverter for converting an output from the DC power source circuit into an AC output of a predetermined frequency; an overvoltage detector for detecting an overvoltage state of the DC power source circuit; and a stopper for stopping the operation of the inverter during detection of the overvoltage state of the DC power source circuit.

A switching element constituting the inverter generally includes a semiconductor device such as an IGBT (abbreviating "an insulated gate bipolar transistor") or a MOSFET (abbreviating "a metal oxide semiconductor field effect transistor"). A dielectric withstand voltage (hereinafter, simply referred to as "a withstand voltage") of the IGBT or the MOSFET variably depends upon a temperature (such as an ambient temperature or a junction temperature). The withstand voltage of the IGBT or the MOSFET becomes lower as the temperature is lower whereas it becomes higher as the temperature is higher.

However, Japanese Patent Laying-Open No. 5-15068 nowhere particularly discloses fluctuations of the withstand voltage of the inverter element in association with a change in temperature of the inverter element. As a consequence, in the above-described inverter type power source device, it is construed that a level of a DC voltage during detection of the overvoltage state of the DC power source circuit by the overvoltage detector is constant all the time. In a case of such protection of the overvoltage, a voltage in excess of the withstand voltage of the inverter element is applied to the inverter when the inverter is at a low temperature: in contrast, it is construed that the stoppage of the inverter degrades operational efficiency of the inverter even if a voltage sufficiently lower than the withstand voltage of the inverter element is input when the inverter is at a high temperature.

DISCLOSURE OF THE INVENTION

An object of the present invention is to provide a control apparatus for a load device, capable of more enlarging an inverter usable temperature range while securely protecting an inverter, and a vehicle provided with the control apparatus.

To sum up, the present invention relates to a control apparatus for a load device including an inverter having a switching element. The control apparatus for a load device includes: a temperature detection unit to detect a temperature of the inverter; a voltage detection unit to detect an applied voltage of the inverter; and a control unit to operate the inverter in a case where the applied voltage is a predetermined upper limit value or lower whereas to stop the inverter in a case where the applied voltage is higher than the upper limit value based on a voltage detection result by the voltage detection unit. The control unit sets the upper limit value based on a temperature detection result by the temperature detection unit in consideration of temperature dependency of a withstand voltage of the switching element.

Preferably, the load device further includes a step-up circuit that steps up a DC voltage from a DC power source, so as to apply the DC voltage stepped up in the inverter as the applied voltage. The control unit controls the step-up circuit such that the applied voltage becomes the upper limit value or lower.

More preferably, the load device further includes a rotating electric machine to be connected to the inverter. The control unit controls the inverter such that a load of the rotating electric machine is restricted in a case where the temperature of the inverter is higher than a predetermined value.

Preferably, the control unit sets the upper limit value by using a temperature estimation result in the inverter based on the operational status of the inverter in a case where the temperature detection result by the temperature detection unit is abnormal.

More preferably, the control unit sets the upper limit value by the using of the temperature estimation result in a case where the temperature estimation result falls within a predetermined temperature region whereas the control unit fixes the upper limit value in a case where the temperature estimation result does not fall within the predetermined temperature region.

Preferably, the control unit includes: a setting unit to set the upper limit value based on the temperature detection result by the temperature detection unit; and a determination unit to determine whether or not the upper limit value set by the setting unit is correct based on the temperature detection result by the temperature detection unit and a predetermined relationship between the temperature of the inverter and the upper limit value. The setting unit fixes the upper limit value in a case where a determination result by the determination unit reveals that the setting of the upper limit value is not correct.

A vehicle according to another aspect of the present invention includes: a load device including an inverter having a switching element; and a control apparatus for the load device. The control apparatus includes: a temperature detection unit to detect a temperature of the inverter; a voltage detection unit to detect an applied voltage of the inverter; and a control unit to operate the inverter in a case where the applied voltage is a predetermined upper limit value or lower whereas to stop the inverter in a case where the applied voltage is higher than the upper limit value based on a voltage detection result by the voltage detection unit. The control unit sets the upper limit value based on a temperature detection result by the temperature detection unit in consideration of temperature dependency of a withstand voltage of the switching element.

Preferably, the load device further includes a step-up circuit that steps up a DC voltage from a DC power source, so as to apply the DC voltage stepped up in the inverter as the applied voltage. The control unit controls the step-up circuit such that the applied voltage becomes the upper limit value or lower.

More preferably, the load device further includes a rotating electric machine to be connected to the inverter. The control unit controls the inverter such that a load of the rotating electric machine is restricted in a case where the temperature of the inverter is higher than a predetermined value.

Preferably, the control unit sets the upper limit value by using a temperature estimation result in the inverter based on the operational status of the inverter in a case where the temperature detection result by the temperature detection unit is abnormal.

More preferably, the control unit should set the upper limit value by using the temperature estimation result in a case where the temperature estimation result falls within a predetermined temperature region whereas the control unit fixes the upper limit value in a case where the temperature estimation result does not fall within the predetermined temperature region.

Preferably, the control unit includes: a setting unit to set the upper limit value based on the temperature detection result by the temperature detection unit; and a determination unit to determine whether or not the upper limit value set by the setting unit is correct based on the temperature detection result by the temperature detection unit and a predetermined relationship between the temperature of the inverter and the upper limit value. The setting unit fixes the upper limit value in a case where a determination result by the determination unit reveals that the setting of the upper limit value is not correct.

According to the present invention, the upper limit value of the voltage to be applied to the inverter is set according to the change in withstand voltage of the switching element constituting the inverter in association with the temperature, thus more enlarging a temperature range in which the inverter can be used while securely protecting the inverter.

BRIEF DESCRIPTION OF THE DRAWINGS

FIG. 2 is a circuit diagram illustrating, in detail, the surroundings of an inverter and a step-up unit in a vehicle 1 illustrated in FIG. 1.

BEST MODES FOR CARRYING OUT THE INVENTION

Figure 1:
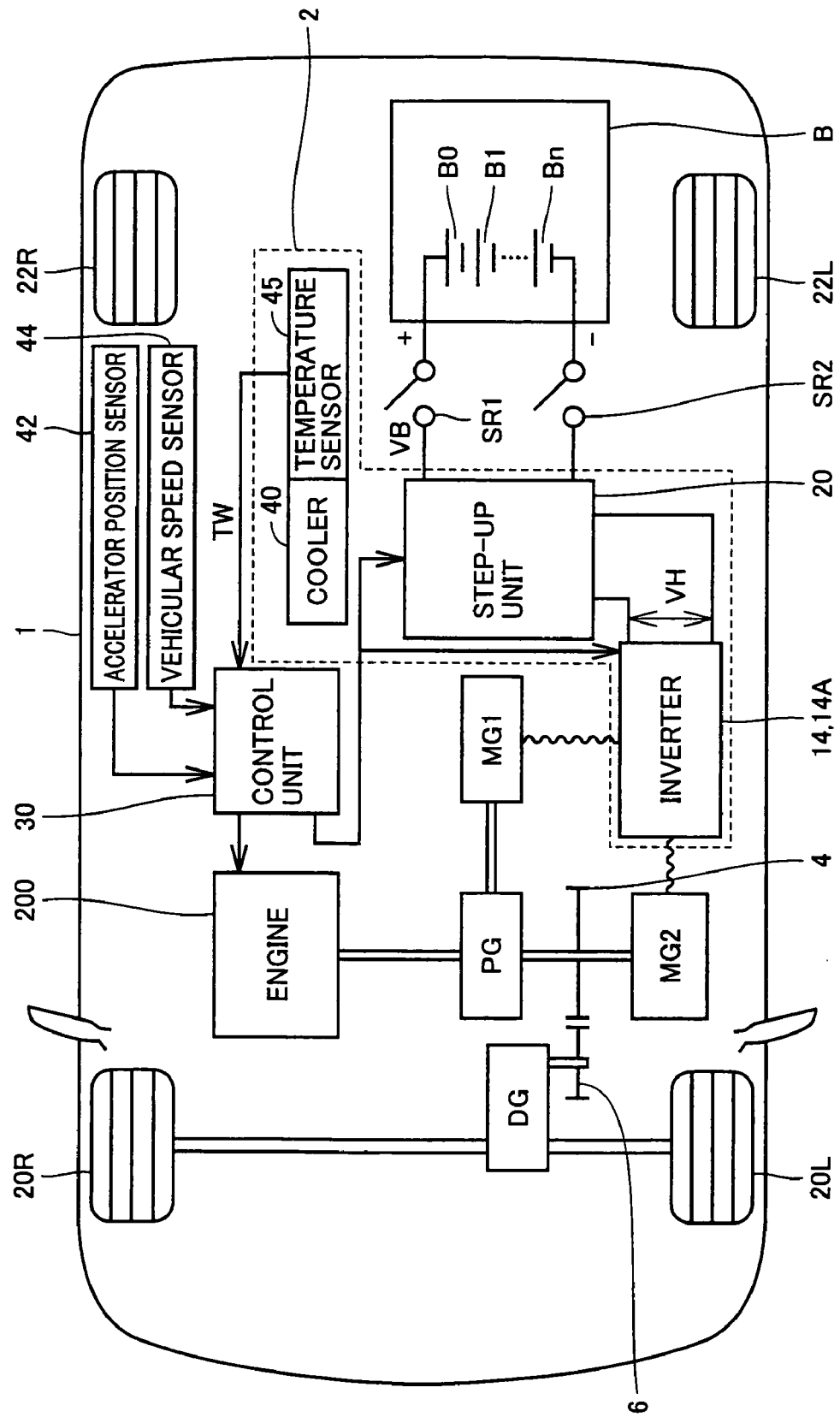
FIG. 1 is a block diagram illustrating the configuration of a vehicle having a control apparatus for a load device mounted thereon in a first embodiment according to the present invention.

Embodiments according to the present invention will be described in detail below in reference to the attached drawings. Here, the same or corresponding parts in the drawings are designated by the same symbols, and therefore, duplicated description will not be repeated.

First Embodiment

FIG. 1 is a block diagram illustrating the configuration of a vehicle having a control apparatus for a load device mounted thereon in a first embodiment according to the present invention.

With reference to FIG. 1, a vehicle 1 is a hybrid automobile. Vehicle 1 includes front wheels 20R and 20L, rear wheels 22R and 22L, an engine 200, a planetary gear PG, a differential gear DG and gears 4 and 6.

Vehicle 1 further includes a battery B and a voltage converting unit 2. Voltage converting unit 2 includes a step-up unit 20 for stepping up a DC voltage output from battery B, inverters 14 and 14A for supplying or receiving a DC electric power to or from step-up unit 20, a cooler 40 and a temperature sensor 45.

Vehicle 1 further includes a motor generator MG1 for generating power upon receipt of power from engine 200 via planetary gear PG and a motor generator MG2 having its rotation shaft connected to planetary gear PG. Inverters 14 and 14A are connected to each of motor generators MG1 and MG2, thereby converting an AC electric power and the DC electric power from the step-up circuit into each other.

Planetary gear PG includes a sun gear, a ring gear, a pinion gear meshing with both of the sun gear and the ring gear, and a planetary carrier for rotatably supporting the pinion gear around the sun gear. Planetary gear PG has first to third rotation shafts. The first rotation shaft is a rotation shaft for the planetary carrier connected to engine 200. The second rotation shaft is a rotation shaft for the sun gear connected to motor generator MG1. The third rotation shaft is a rotation shaft for the ring gear connected to motor generator MG2.

To the third rotation shaft is fixed gear 4, which transmits the power to differential gear DG by driving gear 6. The differential gear DG transmits the power received from gear 6 to front wheels 20R and 20L, and further, transmits rotational force of front wheels 20R and 20L to the third rotation shaft of planetary gear PG via gears 6 and 4.

Planetary gear PG is interposed among engine 200 and motor generators MG1 and MG2, to fulfill the function of dividing the power. That is to say, when the rotations of the two out of the three rotation shafts in planetary gear PG are determined, the rotation of the residual one rotation shaft is naturally determined. As a consequence, the amount of power generation by motor generator MG1 is controlled and motor generator MG2 is driven while engine 200 is operated in a most efficient region, so as to control a vehicular speed, thereby implementing an automobile excellent in energy efficiency as a whole.

Battery B serving as a DC power source is constituted of, for example, a secondary battery made of nickel hydride or a lithium ion. Battery B supplies the DC power to step-up unit 20, and further, is electrically charged by the DC power supplied from step-up unit 20.

Step-up unit 20 steps up a DC voltage (i.e., a voltage VB) received from battery B, and then, supplies a stepped-up DC voltage (i.e., a voltage VH) to inverters 14 and 14A. Inverters 14 and 14A convert the supplied DC voltage into an AC voltage, thereby controllably driving motor generator MG1 at the time of start of the engine. After the start of the engine, an AC electric power generated by motor generator MG1 is converted into a DC electric power by inverters 14 and 14A, to be then converted, by step-up unit 20, into a voltage suitable for electric charging battery B, thereby electrically charging battery B.

Additionally, inverters 14 and 14A drive motor generator MG2. Motor generator MG2 assists engine 200, to thus drive front wheels 20R and 20L. At the time of braking, motor generator MG2 performs a regenerative operation, and then, converts rotational energy of the wheel into electric energy. The obtained electric energy is returned to battery B via inverters 14 and 14A and step-up unit 20.

Battery B is an assembled battery. Namely, battery B includes a plurality of cell units B0 to Bn connected in series to each other. Between step-up unit 20 and battery B are interposed system main relays SR1 and SR2, which shut out a high voltage during non-operation of the vehicle.

Vehicle 1 further includes a control unit 30, an accelerator position sensor 42 and a vehicular speed sensor 44. Control unit 30 controls engine 200, inverters 14 and 14A and step-up unit 20 in response to an instruction by a driver and outputs from various kinds of sensors (including accelerator position sensor 42 and vehicular speed sensor 44) fixed to the vehicle.

Cooler 40 circulates a cooling medium, so as to exchange heat between the cooling medium and voltage converting unit 2, thereby cooling voltage converting unit 2. Cooler 40 is, for example, an electric water pump. Temperature sensor 45 detects the temperature of the cooling medium, and then, outputs a temperature value TW as a temperature detection result to control unit 30. Temperature value TW is information on the temperature of the inverter. Here, temperature sensor 45 may be disposed around inverters 14 and 14A, to detect atmospheric temperatures of inverters 14 and 14A.

Control unit 30 sets an upper limit value of voltage VH based on temperature value TW, and then, controls step-up unit 20 such that voltage VH does not exceed the upper limit value. Control unit 30 stops inverters 14 and 14A in a case where voltage VH exceeds the upper limit value.

Figure 2:
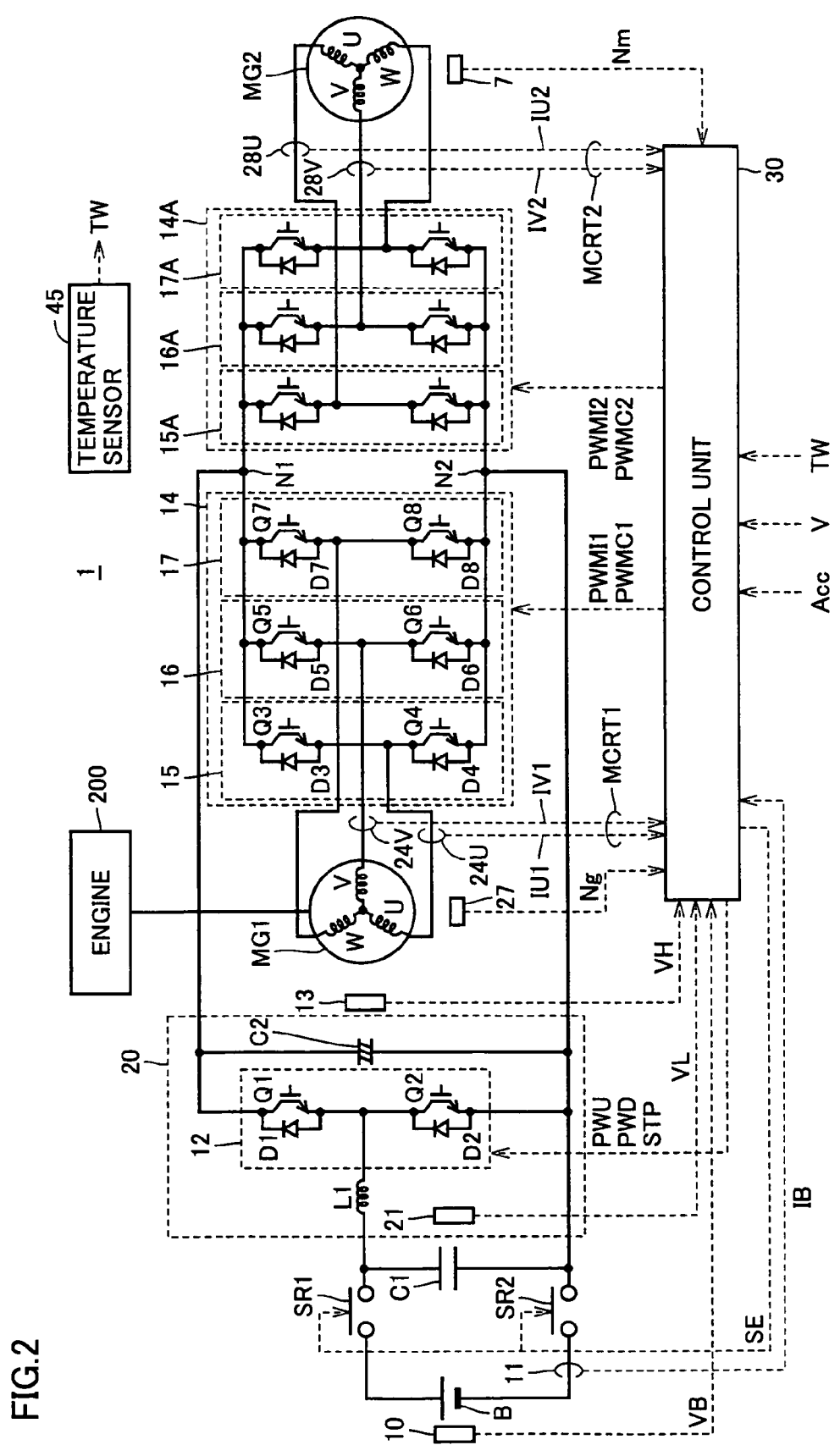

FIG. 2 is a circuit diagram illustrating, in detail, the surroundings of the inverter and the step-up unit in vehicle 1 illustrated in FIG. 1.

With reference to FIG. 2, vehicle 1 is provided with battery B, a voltage sensor 10, a current sensor 11, system main relays SR1 and SR2, a capacitor C1, step-up unit 20, inverters 14 and 14A, current sensors 24U and 24V, motor generators MG1 and MG2, engine 200, temperature sensor 45 and control unit 30. In order to prevent any complication of the drawing, cooler 40 illustrated in FIG. 1 is not illustrated in FIG. 2.

Voltage sensor 10 detects a DC voltage output from battery B, and then, outputs a detection result (i.e., voltage VB) to control unit 30. Current sensor 11 detects a DC current flowing between battery B and step-up unit 20, and then, outputs a detected current as a DC current IB to control unit 30. System main relays SR1 and SR2 are turned on or off in response to a signal SE output from control unit 30. Capacitor C1 smoothes an inter-terminal voltage of battery B during turning-on of system main relays SR1 and SR2.

Step-up unit 20 includes a voltage sensor 21, a reactor L1, a converter 12 and a capacitor C2. Reactor L1 is connected at one end thereof to a positive electrode of battery B via system main relay SR1.

Converter 12 includes IGBT elements Q1 and Q2 connected in series between output terminals of converter 12 for outputting voltage VH and diodes D1 and D2 connected in parallel to IGBT elements Q1 and Q2, respectively.

Reactor L1 is connected at the other end thereof to an emitter of IGBT element Q1 and a collector of IGBT element Q2. A cathode of diode D1 is connected to a collector of IGBT element Q1, and further, an anode of diode D1 is connected to the emitter of IGBT element Q1. In the meantime, a cathode of diode D2 is connected to the collector of IGBT element Q2, and further, an anode of diode D2 is connected to an emitter of IGBT element Q2.

Voltage sensor 21 detects a voltage on an input side of converter 12 as a voltage value VL. Current sensor 11 detects a current flowing in reactor L1 as a current value IB. Capacitor C2 is connected to an output side of converter 12 so as to accumulate energy transmitted from converter 12 and smooth the voltage. Voltage sensor 13 detects a voltage on the output side of converter 12, that is, a voltage between electrodes of capacitor C2 as voltage value VH.

In a hybrid vehicle, engine 200 and motor generator MG1 transmits or receives mechanical power to or from each other. At some time, motor generator MG1 starts the engine: at other time, motor generator MG1 functions as a generator for generating power upon receipt of power from the engine. Motor generator MG1 is driven by inverter 14.

Inverter 14 drives motor generator MG1 upon receipt of a step-up potential from converter 12. Furthermore, inverter 14 returns the electric power generated in motor generator MG1 to converter 12 in association with regenerative braking. At this time, converter 12 is controlled by control unit 30 in such a manner as to actuate as a step-down circuit.

Inverter 14 includes a U-phase arm 15, a V-phase arm 16 and a W-phase arm 17. U-phase arm 15, V-phase arm 16 and W-phase arm 17 are connected in parallel between output lines of converter 12.

U-phase arm 15 includes IGBT elements Q3 and Q4 connected in series to each other and diodes D3 and D4 connected in parallel to IGBT elements Q3 and Q4, respectively. A cathode of diode D3 is connected to a collector of IGBT element Q3, and further, an anode of diode D3 is connected to an emitter of IGBT element Q3. In the meantime, a cathode of diode D4 is connected to a collector of IGBT element Q4, and further, an anode of diode D4 is connected to an emitter of IGBT element Q4.

V-phase arm 16 includes IGBT elements Q5 and Q6 connected in series to each other and diodes D5 and D6 connected in parallel to IGBT elements Q5 and Q6, respectively. A cathode of diode D5 is connected to a collector of IGBT element Q5, and further, an anode of diode D5 is connected-to an emitter of IGBT element Q5. In the meantime, a cathode of diode D6 is connected to a collector of IGBT element Q6, and further, an anode of diode D6 is connected to an emitter of IGBT element Q6.

W-phase arm 17 includes IGBT elements Q7 and Q8 connected in series to each other and diodes D7 and D8 connected in parallel to IGBT elements Q7 and Q8, respectively. A cathode of diode D7 is connected to a collector of IGBT element Q7, and further, an anode of diode D7 is connected to an emitter of IGBT element Q7. In the meantime, a cathode of diode D8 is connected to a collector of IGBT element Q8, and further, an anode of diode D8 is connected to an emitter of IGBT element Q8.

Respective intermediate points of the phase arms are connected to phase terminals of phase coils in motor generator MG1, respectively. Specifically, motor generator MG1 is a three-phase permanent magnet motor. Each of the three U-, V- and W-phase coils is connected at one end thereof to a middle point. The U-phase coil is connected at the other end thereof to connection nodes of IGBT elements Q3 and Q4. Moreover, the V-phase coil is connected at the other end thereof to connection nodes of IGBT elements Q5 and Q6. Additionally, the W-phase coil is connected at the other end thereof to connection nodes of IGBT elements Q7 and Q8.

Current sensors 24U and 24V detect current values IU1 and IV1 of the current flowing in U- and V-phase stator coils in motor generator MG1 as a motor current value MCRT1, and then, outputs motor current value MCRT1 to control unit 30. A rotational number Ng of motor generator MG1 is detected by a rotational speed sensor 27.

Inverter 14A drives motor generator MG2 upon receipt of a step-up potential from converter 12. Furthermore, inverter 14A returns the electric power generated in motor generator MG2 to converter 12 in association with regenerative braking. At this time, converter 12 is controlled by control unit 30 in such a manner as to actuate as a step-down circuit. A rotational speed Nm of motor generator MG2 is detected by a rotational speed sensor 7.

Inverter 14A includes a U-phase arm 15A, a V-phase arm 16A and a W-phase arm 17A. U-phase arm 15A, V-phase arm 16A and W-phase arm 17A are connected in parallel between output lines of converter 12. The configurations of U-phase arm 15A, V-phase arm 16A and W-phase arm 17A are identical to those of U-phase arm 15, V-phase arm 16 and W-phase arm 17, respectively, and therefore, their description is not repeated here.

Each of intermediate points of the U-, V- and W-phase arms of inverter 14A is connected to one end of each of the U-, V- and W-phase coils in motor generator MG2. Specifically, motor generator G2 is a three-phase permanent magnet motor. Each of the three U-, V- and W-phase coils is connected at the other end thereof to a middle point.

Current sensors 28U and 28V detect current values IU2 and IV2 of the current flowing in U- and V-phase stator coils in motor generator MG2 as a motor current value MCRT2, and then, outputs motor current value MCRT2 to control unit 30.

Control unit 30 receives an output signal Acc of accelerator position sensor 42 and a vehicular speed V detected by vehicular speed sensor 44. Control unit 30 further receives motor rotational number Nm and motor current value MCRT2 corresponding to motor generator MG2 in addition to motor rotational number Ng, voltage values VB, VL and VH, current value IB and motor current value MCRT1. Control unit 30 outputs a step-up instruction PWU, a step-down instruction PWD and a stop instruction STP to step-up unit 20 in accordance with these inputs.

Control unit 30 outputs, with respect to inverter 14, a drive instruction PWMI1, by which a DC voltage as an output from converter 12 is converted into an AC voltage for driving motor generator MG1, and a regeneration instruction PWMC1, by which the AC voltage generated in motor generator MG1 is converted into the DC voltage, to be thus returned onto the converter 12 side. In contrast, control unit 30 outputs, with respect to inverter 14A, a drive instruction PWMC2, by which the DC voltage as the output from converter 12 is converted into an AC voltage for driving motor generator MG2, and a regeneration instruction PWMC2, by which the AC voltage generated in motor generator MG2 is converted into the DC voltage, to be thus returned onto the converter 12 side.

Inverter 14A is connected in parallel to inverter 14 while holding a node Ni and another node N2 therebetween, and further, is connected to step-up unit 20.

Control unit 30 receives temperature value TW from temperature sensor 45, and then, sets the upper limit value of voltage VH, thereby controlling step-up unit 20 such that voltage VH cannot exceed the upper limit value. For example, since the temperature of the IGBT element is low immediately after the start of operation of inverters 14 and 14A, the withstand voltage of the IGBT element becomes low. In this case, control unit 30 sets the upper limit value to a lower value. In contrast, when inverters 14 and 14A actuate so that their temperatures are increased, control unit 30 sets the upper limit value of voltage VH to a higher value.

An outline of control of voltage VH will be given below. Converter 12 actuates as the step-up circuit by turning IGBT element Q2 on or off in a state in which IGBT element Q1 is OFF. That is to say, there is formed a channel through which the current flows from the positive electrode of battery B to a negative electrode of battery B via reactor L1 and IGBT element Q2 in a state in which IGBT element Q2 is ON. While the current flows, the energy is accumulated in reactor L1.

Then, when IGBT element Q2 is turned off, the energy accumulated in reactor L1 flows toward inverter 14 through diode D1. In this manner, a voltage between electrodes in capacitor C2 is increased. As a consequence, an output voltage of converter 12 given to inverter 14 is stepped up. Thus, voltage VH can be set to a desired value by appropriately determining an ON period and an OFF period of IGBT element Q2.

Figure 3:
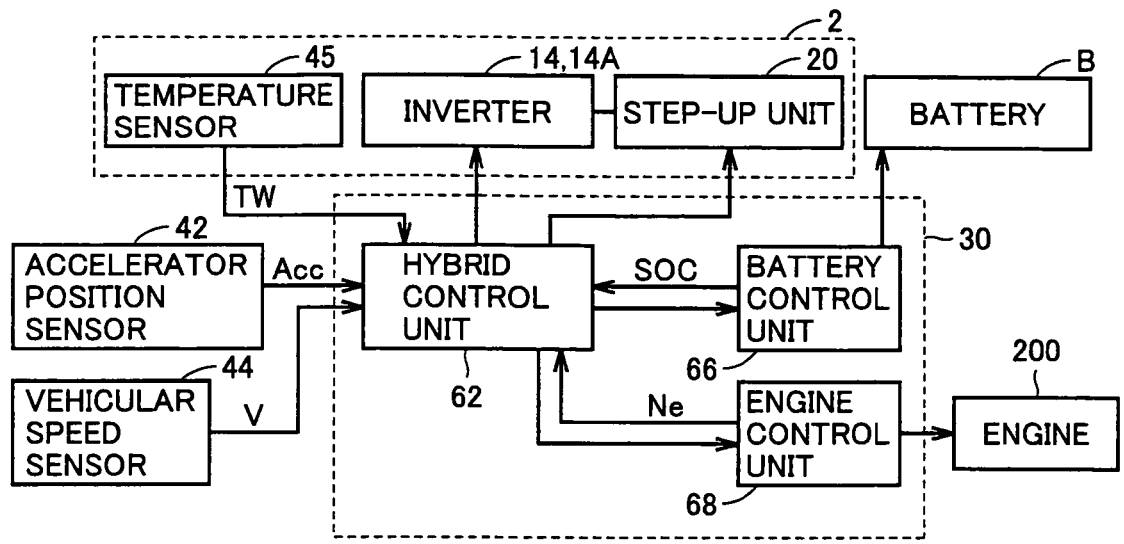
FIG. 3 is a drawing for illustrating a functional block of a control unit 30 illustrated in FIG. 1 and relevant peripheral devices.

FIG. 3 is a drawing for illustrating a functional block of control unit 30 illustrated in FIG. 1 and relevant peripheral devices. Control unit 30 can be implemented with any of hardware and software.

Referring to FIG. 3, control unit 30 includes a hybrid control unit 62, a battery control unit 66 and an engine control unit 68.

Battery control unit 66 determines a charged state SOC of battery B based on a sum of charge/discharge current of battery B, and then, transmits it to hybrid control unit 62.

Engine control unit 68 performs a throttle control of engine 200, and further, detects an engine speed Ne of engine 200, to transmit it to hybrid control unit 62.

Hybrid control unit 62 calculates an output requested by a driver (i.e., a requested power) based on output signal Acc from accelerator position sensor 42 and vehicular speed V detected by vehicular speed sensor 44. Hybrid control unit 62 calculates a required drive force (i.e., a total power) in consideration of charged state SOC of battery B in addition to the requested power requested by the driver, and further, calculates an engine speed requesting the engine and power requesting the engine.

Hybrid control unit 62 transmits the requested engine speed and the requested power to engine control unit 68, which thus performs the throttle control for engine 200.

Hybrid control unit 62 calculates a driver request torque according to a traveling state, and then, allows inverter 14A to drive motor generator MG2, and further, allows motor generator MG1 to generate the power, as necessary. At this time, hybrid control unit 62 controls inverters 14 and 14A based on temperature value TW output from temperature sensor 45.

The drive force of engine 200 is divided into force for directly driving the wheel and force for driving motor generator MG1. As a consequence, the sum of the drive force for motor generator MG2 and the engine directly driving force becomes the drive force for the vehicle.

Figure 4:
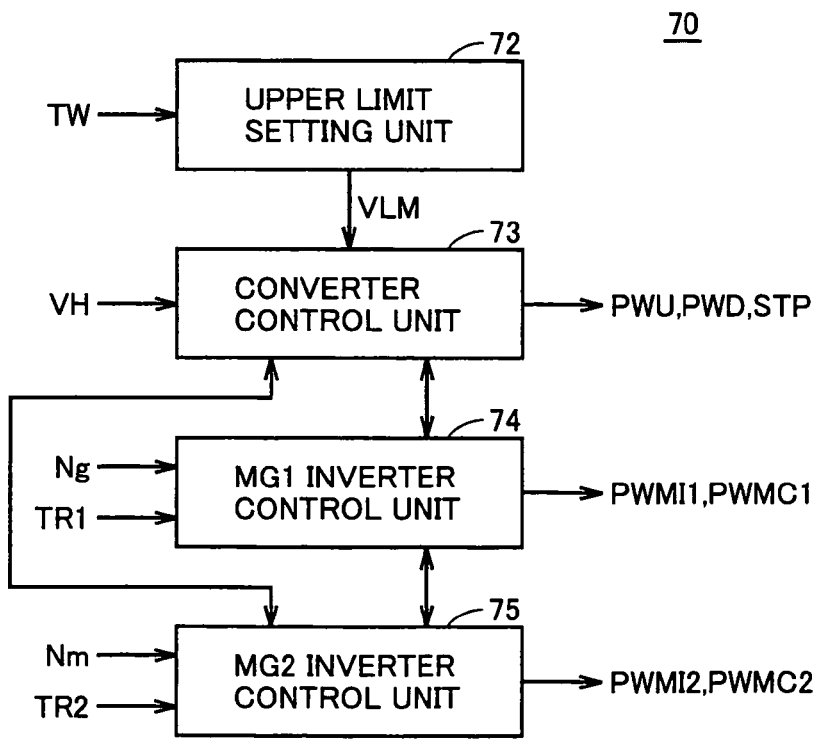
FIG. 4 is a drawing for illustrating the configuration of a control system of a voltage converting unit 2 included in a hybrid controller 62 illustrated in FIG. 3.

FIG. 4 is a drawing for illustrating the configuration of a control system of voltage converting unit 2 included in hybrid control unit 62 illustrated in FIG. 3.

Referring to FIG. 4, a voltage control unit 70 includes an upper limit setting unit 72, a converter control unit 73, an MG1 inverter control unit 74 and an MG2 inverter control unit 75.

Upper limit setting unit 72 sets an upper limit value VLM of voltage VH (see FIG. 2) according to temperature value TW. Converter control unit 73 outputs step-up instruction PWU and step-down instruction PWD upon receipt of upper limit value VLM and voltage VH, and then, controls voltage VH in such a manner as not to exceed upper limit value VLM. Moreover, converter control unit 73 outputs stop instruction STP.

MG1 inverter control unit 74 outputs drive instruction PWMI1 or regeneration instruction PWMC1 upon receipt of a torque command value TR1 and rotational number Ng of motor generator MG1. MG2 inverter control unit 75 outputs drive instruction PWMI2 or regeneration instruction PWMC2 upon receipt of a torque command value TR2 and rotational number Nm of motor generator MG2. Incidentally, torque command values TR1 and TR2 are generated inside of control unit 30.

Figure 5:
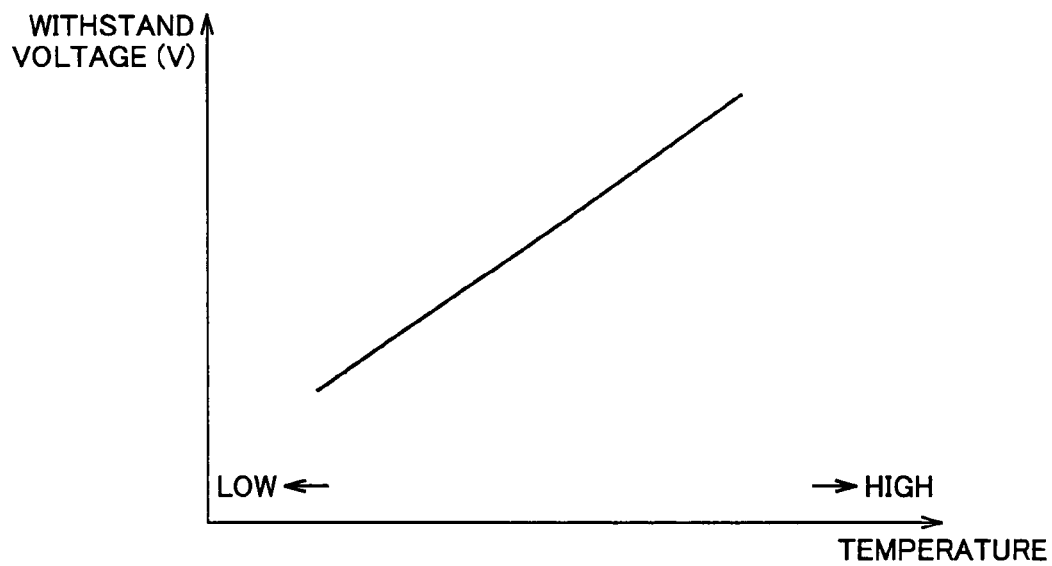
FIG. 5 is a drawing for illustrating a change in withstand voltage of an IGBT element included in an inverter 14 or 14A according to a temperature.

FIG. 5 is a drawing for illustrating a change in withstand voltage of the IGBT element included in inverters 14 and 14A according to the temperature. With reference to FIG. 5, the withstand voltage of the IGBT element is higher as the temperature of the IGBT element is higher, whereas it is lower as the temperature is lower. The change in withstand voltage according to the temperature illustrated in FIG. 5 is stored as a mathematical expression or a map inside of upper limit setting unit 72.

Figure 6:
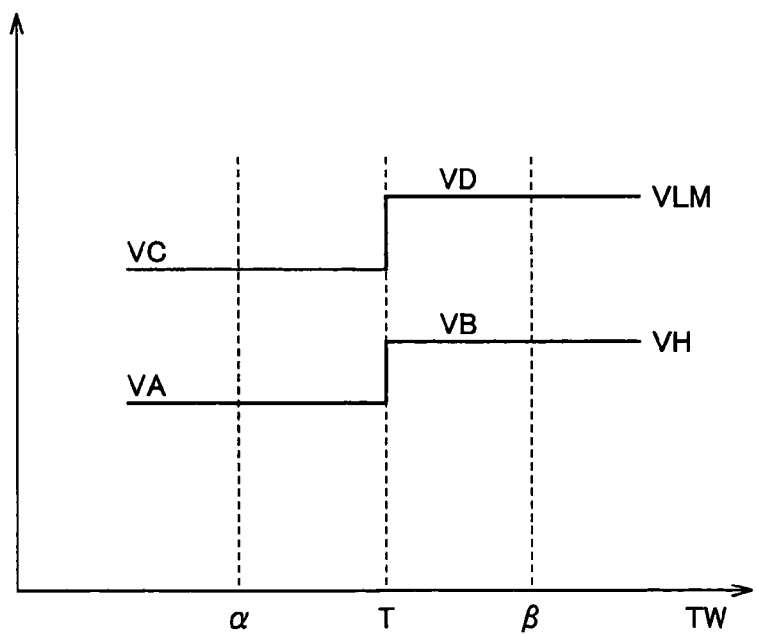
FIG. 6 is a drawing for illustrating a relationship between a temperature value TW and an upper limit value VLM and a relationship between upper limit value VLM and a voltage VH.

FIG. 6 is a drawing for illustrating a relationship between temperature value TW and upper limit value VLM and a relationship between upper limit value VLM and voltage VH.

Referring to FIG. 6, in a case where temperature value TW is lower than a predetermined temperature value T (for example, TW=$\alpha$), upper limit value VLM is equal to a voltage value VC. At this time, voltage VH becomes a voltage value VA lower than voltage value VC. In contrast, in a case where temperature value TW is higher than predetermined temperature value T (for example, TW=$\beta$), upper limit value VLM is equal to a voltage value VD. Here, voltage value VD is higher than voltage value VC. Voltage VH becomes a voltage value VB lower than voltage value VD. Since VD>VC, voltage value VB also can become higher than voltage value VA. Incidentally, although upper limit value VLM is changed in two steps with respect to temperature value TW in FIG. 6, upper limit value VLM may be changed in steps more than 2.

Figure 7:
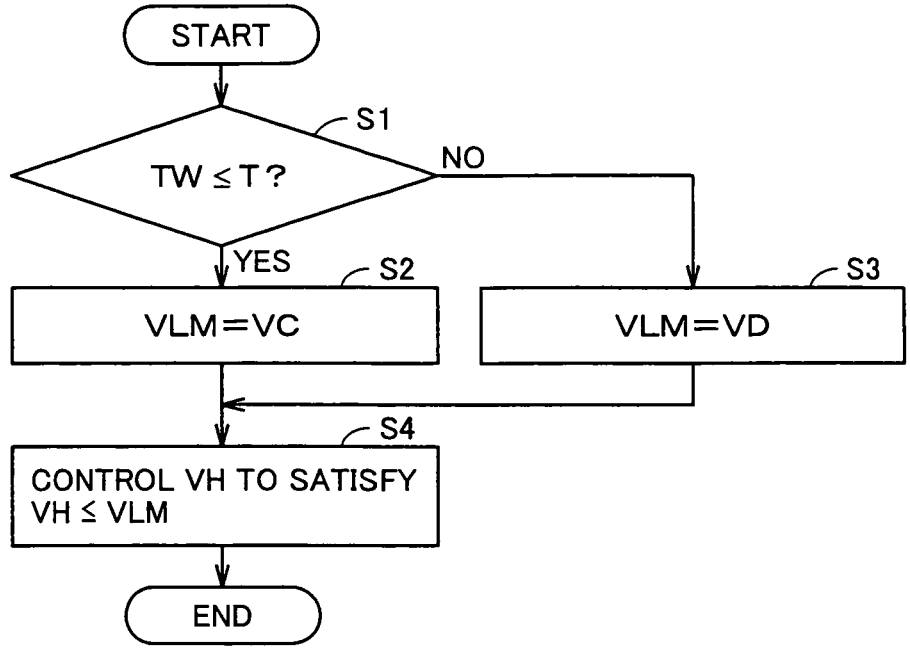
FIG. 7 is a flowchart illustrating control of upper limit value VLM and voltage VH illustrated in FIG. 6.

FIG. 7 is a flowchart illustrating control of upper limit value VLM and voltage VH illustrated in FIG. 6.

With reference to FIGS. 7 and 4, upper limit setting unit 72 first determines whether or not temperature value TW is predetermined temperature value T (see FIG. 6) or lower (step S1). If temperature value TW is predetermined temperature value T or lower (YES in step S1), upper limit setting unit 72 sets upper limit value VLM to voltage value VC (step S2). In contrast, if temperature value TW exceeds predetermined temperature value T (NO in step S1), upper limit setting unit 72 sets upper limit value VLM to voltage value VD (step S3). When upper limit value VLM is decided in step S2 or S3, converter control unit 73 controls converter 12 based on upper limit value VLM, thus controlling voltage VH in such a manner as to equalize it to upper limit value VLM or lower (step S4). Upon completion of the processing in step S4, the entire control routine comes to an end.

Referring to FIG. 2, the first embodiment will be comprehensively described below. The control apparatus for the load device in the first embodiment is provided with: temperature sensor 45 detecting the temperatures of inverters 14 and 14A; voltage sensor 13 detecting the applied voltage (i.e., voltage VH) of inverters 14 and 14A, and control unit 30 actuating inverters 14 and 14A in a case where the applied voltage is predetermined upper limit value VLM or lower based on the voltage detection result by voltage sensor 13 whereas for stopping inverters 14 and 14A in a case where the applied voltage is higher than upper limit value VLM. Control unit 30 sets upper limit value VLM based on the change in withstand voltage of the IGBT element due to the temperature and the temperature detection result (i.e., temperature value TW) by temperature sensor 45. Preferably, the load device further includes step-up unit 20 stepping up the DC voltage from battery B so as to apply the applied voltage to inverters 14 and 14A. Control unit 30 controls step-up unit 20 such that the applied voltage becomes upper limit value VLM or lower.

As described above, control unit 30 sets upper limit value VLM of voltage VH, thus preventing any damage on inverters 14 and 14A when inverters 14 and 14A are at the low temperature. In contrast, control unit 30 makes it difficult to stop the inverter (i.e., to protect the inverter from the overvoltage) irrespective of the input of the sufficiently low voltage in comparison with the withstand voltage of the IGBT element by increasing the upper limit value of voltage VH when inverters 14 and 14A are at the high temperature. Consequently, it is possible to enlarge the temperature range in which the inverter can actuate.

Second Embodiment

The configuration of a vehicle having a control apparatus for a load device mounted thereon in a second embodiment is identical to that of vehicle 1 illustrated in FIG. 1. Furthermore, the configuration of a control system of a voltage converting unit 2 in the second embodiment is identical to that illustrated in FIG. 4. In the second embodiment, a control unit 30 limits loads of motor generators MG1 and MG2 when the temperature of an inverter becomes high.

Figure 8:
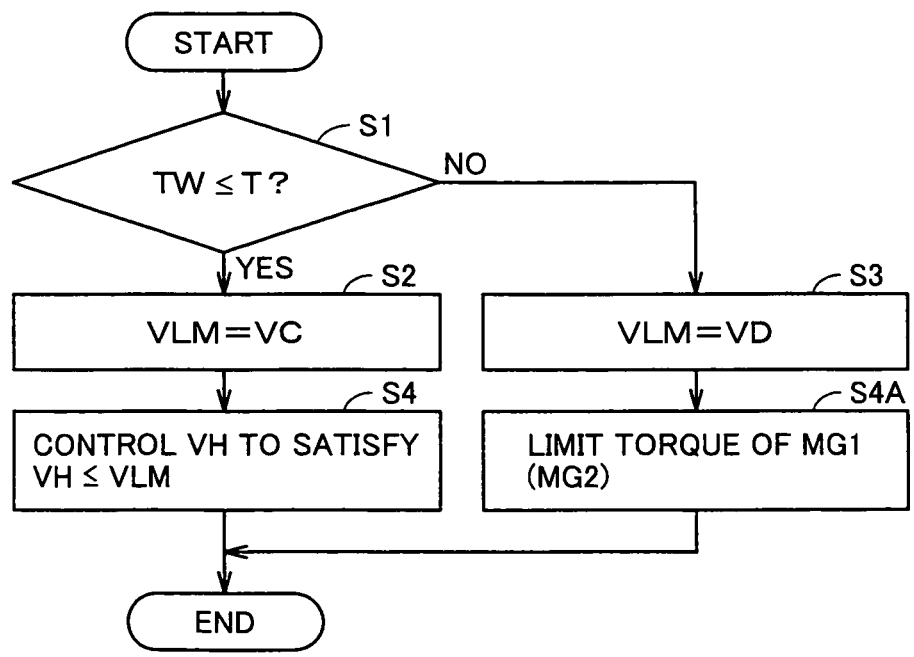
FIG. 8 is a flowchart illustrating control processing executed by a control unit 30 for a load device in a second embodiment.

FIG. 8 is a flowchart illustrating control processing executed by control unit 30 for the load device in the second embodiment.

With reference to FIGS. 8 and 7, processings in steps S1 to S4 illustrated in FIG. 8 are identical to those in the corresponding steps in the flowchart in FIG. 7. In the flowchart of FIG. 8, processing in step S4A is executed after the processing in step S3. This point is different from the flowchart of FIG. 7.

In step S4A, control unit 30 limits torques of motor generators MG1 and MG2 so as to prevent torque command values. TR1 and TR2 from exceeding a predetermined value. Referring to FIGS. 8 and 4, an MG1 inverter control unit 74 changes a drive instruction PWMI1 (or a regeneration instruction PWMC1) according to torque command value TR1, changes a current value flowing in an inverter 14, or changes a power factor of motor generator MG1. In the meantime, an MG2 inverter control unit 75 performs the same control as that by MG1 inverter control unit 74. Upon completion of the processing in step S4A, the entire control routine comes to an end.

As described above, in the second embodiment, the control apparatus limits the torques (i.e., loads) of motor generators MG1 and MG2 when the temperature of the inverter is high. When the temperature of the inverter is high, an upper limit value VLM is set to be higher, and therefore, a voltage VH also becomes higher. In a case where no limitation is given to operations of motor generators MG1 and MG2, the amount of heat generated in inverters 14 and 14A also becomes greater when inverters 14 and 14A are operated, thereby causing a further increase in temperature of the inverter. In the second embodiment, the operations of motor generators MG1 and MG2 are limited when the temperature of the inverter is high, thus suppressing a marked increase in temperature of inverters 14 and 14A.

Third Embodiment

In a third embodiment, the temperature of an inverter is estimated in a case of occurrence of abnormality in a temperature sensor, and then, an upper limit value VLM is set based on an estimation result. As a consequence, the inverter can be continuously operated even in a case of the occurrence of the abnormality in the temperature sensor.

Figure 9:
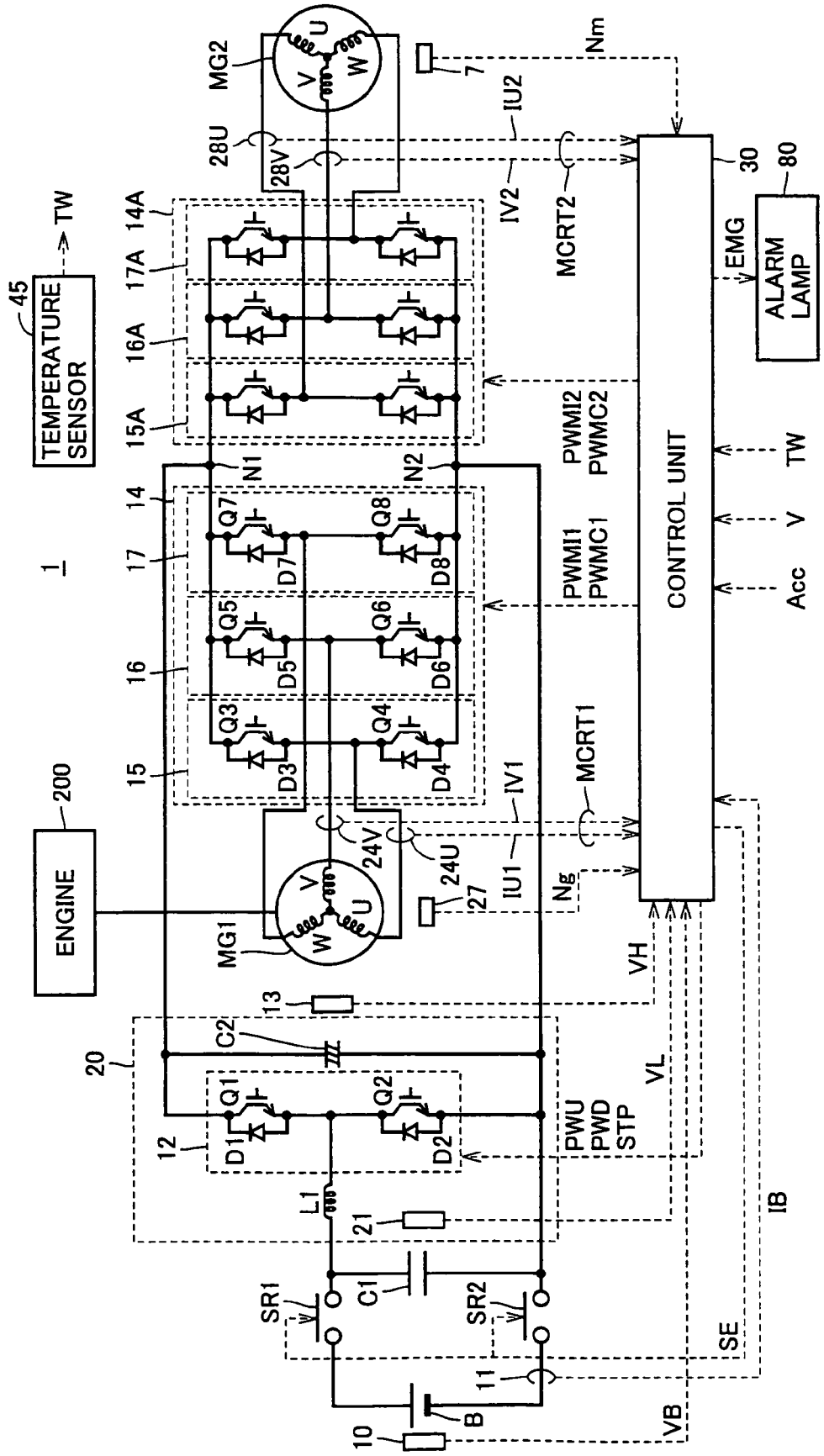
FIG. 9 is a circuit diagram illustrating, in detail, the surroundings of an inverter and a step-up unit in a vehicle having a control apparatus for a load device mounted thereon in a third embodiment.

The entire configuration of a vehicle having a control apparatus for a load device mounted thereon in the third embodiment is identical to that of vehicle 1 illustrated in FIG. 1. Here, as illustrated in FIG. 9, the third embodiment is different from the first and second embodiments in the point that a vehicle 1 is further provided with an alarm lamp 80 which is lighted in response to a signal EMG output from a control unit 30.

Next, with reference to FIGS. 10 and 4, description will be made on the configuration of a control system of a voltage converting unit 2 (see FIG. 1) in the third embodiment.

Figure 10:
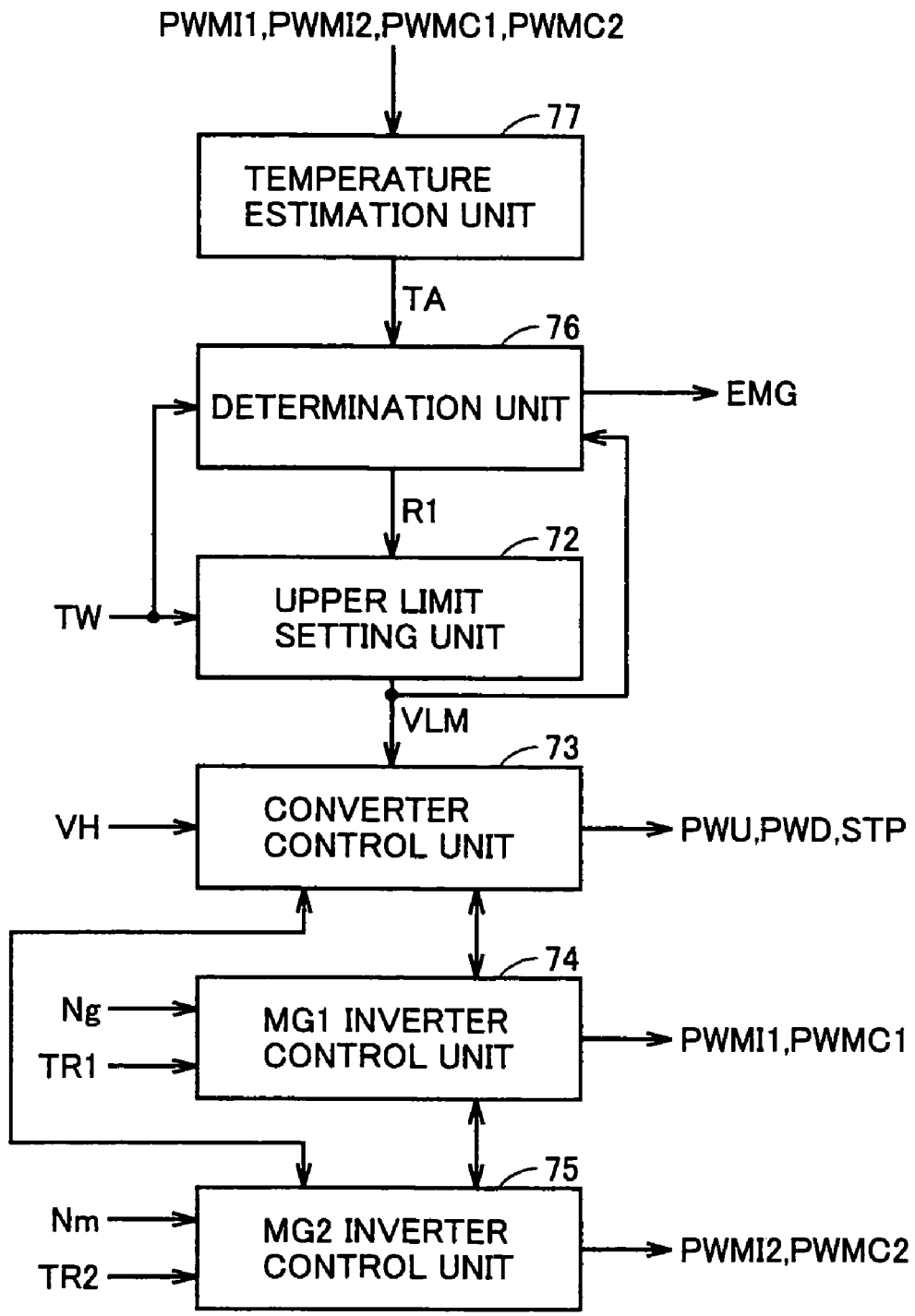
FIG. 10 is a drawing for illustrating the configuration of a control system of a voltage converting unit 2 in the third embodiment.

A voltage control unit 70A illustrated in FIG. 10 is different from voltage control unit 70 illustrated in FIG. 4 in further including a determination unit 76 and a temperature estimation unit 77. Other component parts in voltage control unit 70A have the same configurations as those of the corresponding parts in voltage control unit 70.

Determination unit 76 determines whether or not upper limit value VLM set by an upper limit setting unit 72 is correct upon receipt of a temperature value TW and upper limit value VLM, and then, outputs a determination result R1 to upper limit setting unit 72. If the setting of upper limit value VLM is not correct, determination unit 76 outputs signal EMG.

Determination unit 76 further determines whether or not temperature value TW is reliable based on the estimation result of the temperature of the inverter by temperature estimation unit 77, and then, outputs determination result RI to upper limit setting unit 72.

Temperature estimation unit 77 receives drive instructions PWMI1 and PWMI2 and regeneration instructions PWMC1 and PWMC2 as information on operational conditions of the inverter, and then, estimates an ambient temperature of the inverter based on, for example, a switching frequency, the efficiency of the inverter or heat radiation characteristics of the inverter. Temperature estimation unit 77 outputs a temperature value TA indicating the estimation result to determination unit 76. Here, a temperature estimating method for the inverter is not limited to the above-described method, and for example, temperature estimation unit 77 may estimate the temperature of the inverter based on the output from a temperature sensor which may be disposed in the motor generator.

Figure 11:
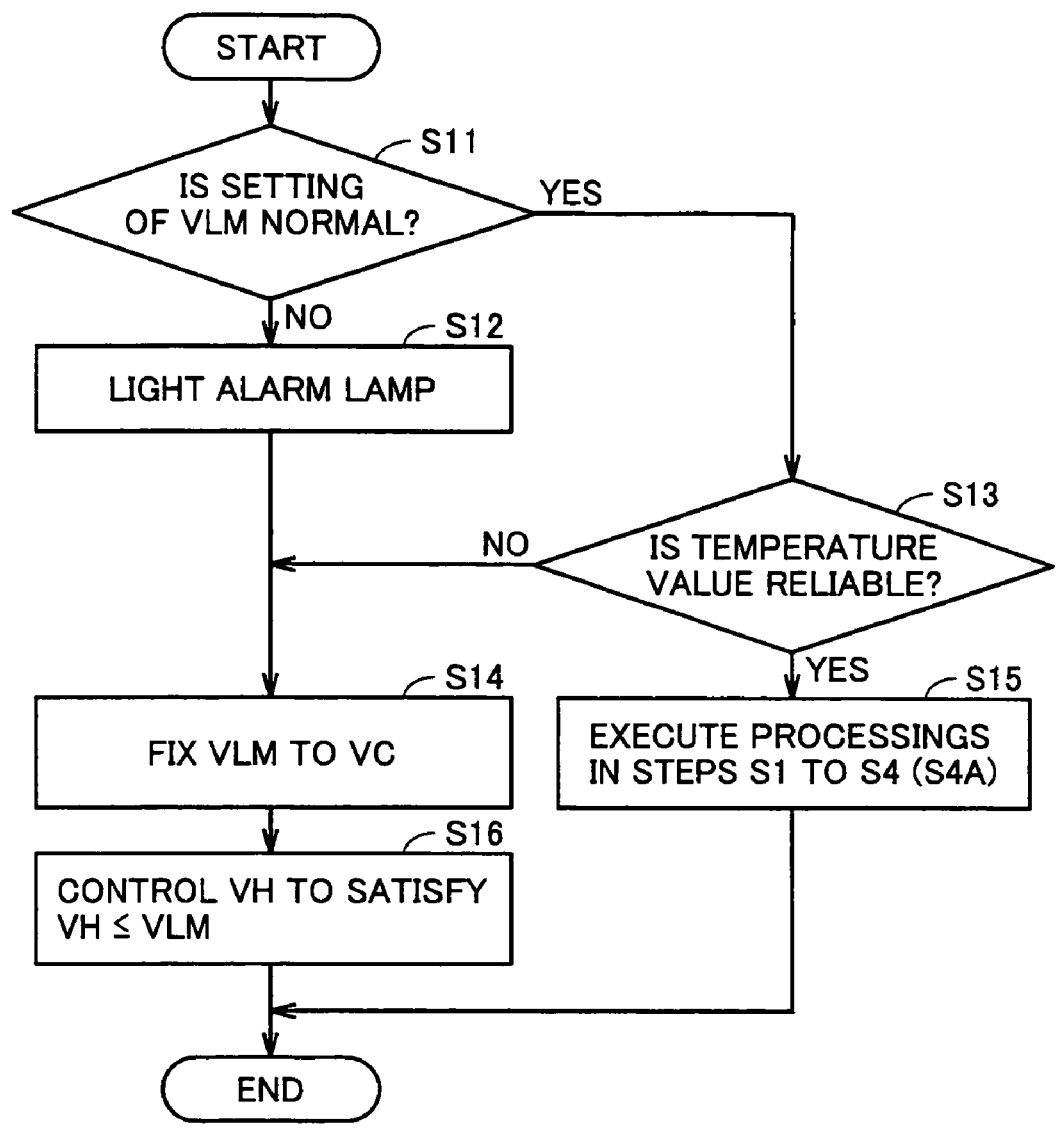
FIG. 11 is a flowchart illustrating setting of upper limit value VLM and control of voltage VH in the third embodiment.

FIG. 11 is a flowchart illustrating the setting of upper limit value VLM and control of voltage VH in the third embodiment.

Referring to FIGS. 11 and 10, determination unit 76 acquires temperature value TW and upper limit value VLM, and then, determines whether or not the setting of upper limit value VLM is normal (step S11). If the setting of upper limit value VLM is abnormal (NO in step S11), determination unit 76 outputs signal EMG, and then, lights alarm lamp 80 (see FIG. 9) (step S12). Upon completion of the processing in step S12, determination unit 76 outputs determination result R1 indicating the occurrence of an abnormality. In this manner, the entire control routine proceeds to step S14.

In the meantime, if the setting of upper limit value VLM is normal (YES in step S11), determination unit 76 determines based on temperature values TW and TA whether or not at least either one of temperature values TW and TA is reliable (step S13). If neither of temperature values TW and TA are reliable (NO in step S13), determination unit 76 outputs determination result R1 indicating the occurrence of the abnormality to upper limit setting unit 72. In this manner, the entire control routine proceeds to step S14.

In step S14, upper limit setting unit 72 fixes upper limit value VLM to a voltage value VC (see FIG. 6) according to determination result R1. Voltage value VC is a lowest value within a setting range of upper limit value VLM. Converter control unit 73 receives upper limit value VLM from upper limit setting unit 72, and then, controls a voltage VH which becomes upper limit value VLM or lower (step S16).

If it is determined in step S13 that temperature value TW or temperature value TA is reliable (YES in step S13), voltage control unit 70A executes the processings in steps S1 to S4 in the flowchart illustrated in FIG. 7 (step S15). Here, the processings in steps S1 to S4A illustrated in FIG. 8 may be executed in step S15. In step 16, voltage VH is controlled to become upper limit value VLM or lower based on temperature value TW or temperature value TA. Upon completion of the processing in step S15 or S16, the entire control routine comes to an end.

Subsequently, a description will be given in more detail of the processings in steps S11 and S13.

Figure 12:
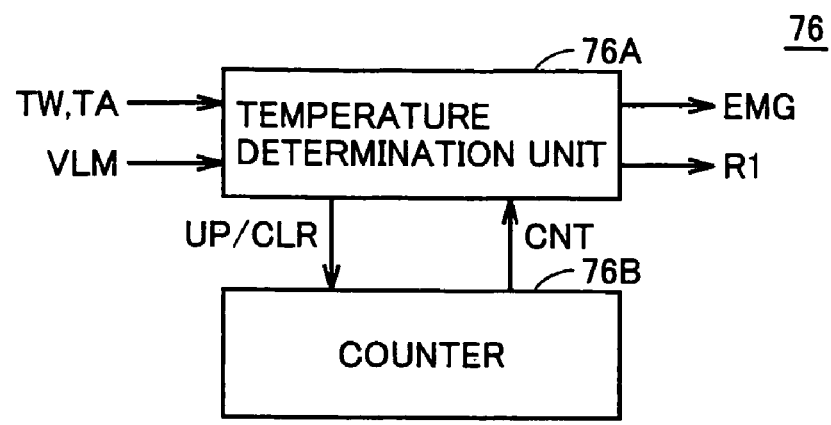
FIG. 12 is a drawing for illustrating a constitutional example of a determination unit 76 illustrated in FIG. 10.

FIG. 12 is a drawing for illustrating a constitutional example of determination unit 76 illustrated in FIG. 10.

With reference to FIG. 12, determination unit 76 includes a temperature determination unit 76A and a counter 76B. Temperature determination unit 76A receives temperature value TW and upper limit value VLM, and then, outputs, to counter 76B, an instruction UP to increase a count value CNT or another instruction CLR to clear the count to 0. Temperature determination unit 76A receives count value CNT from counter 76B.

When count value CNT reaches a predetermined value, temperature determination unit 76A determines based on input temperature value TW and upper limit value VLM whether or not the setting of upper limit value VLM is correct, and then, outputs determination result R1. Temperature determination unit 76A outputs signal EMG if the setting of upper limit value VLM is not correct.

Temperature determination unit 76A further determines the reliability of temperature value TW based on temperature value TA (i.e., the estimated value) and temperature value TW.

Figure 13:
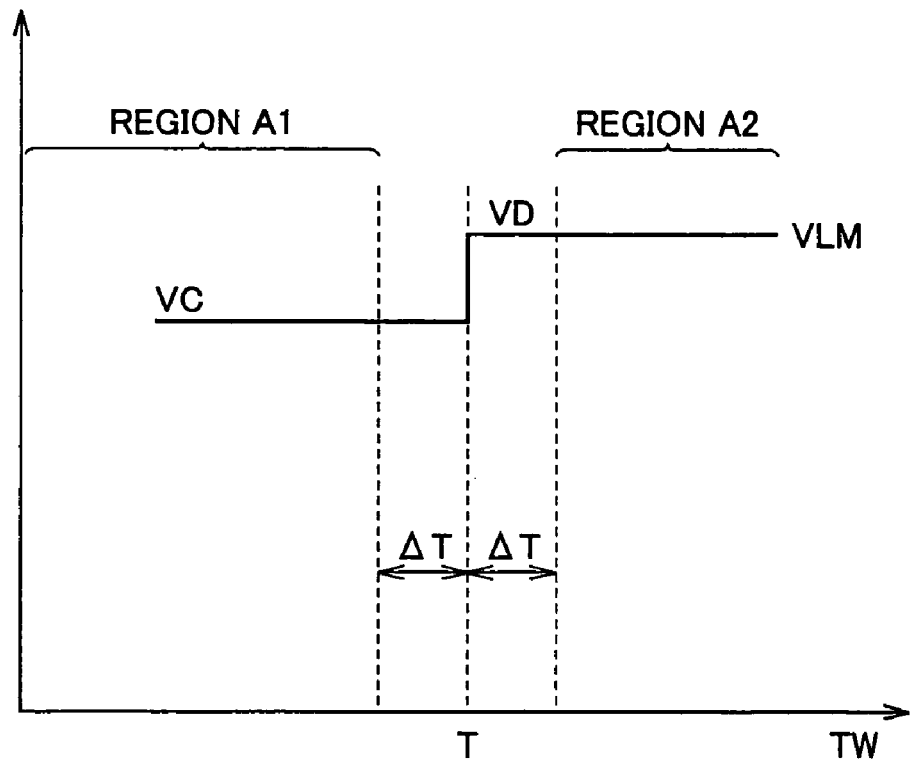
FIG. 13 is a drawing for illustrating the confirmation processing of the setting of upper limit value VLM by a temperature determination unit 76A.

FIG. 13 is a drawing for illustrating a confirmation processing of the setting of upper limit value VLM by temperature determination unit 76A.

Referring to FIGS. 12 and 13, temperature determination unit 76A assures that temperature value TW is included in either one of regions A1 and A2. Temperature determination unit 76A determines whether or not upper limit value VLM corresponding to the assured temperature region and an actually set upper limit value are identical to each other, thereby determining whether or not the setting of the upper limit value is correct.

If temperature value TW is smaller than $(T-\Delta T)$, temperature value TW is included in region A1. In contrast, if temperature value TW is greater than $(T+\Delta T)$, temperature value TW is included in region A2. Here, symbol T designates a predetermined temperature value, and further, $\Delta T$ denotes a value defined based on a measurement error of temperature sensor 45. It is not determined whether or not the setting of the upper limit value TW is correct in a case where temperature value TW falls within a range of $(T \pm \Delta T)$ in consideration of temperature value TW including the error.

Figure 14:
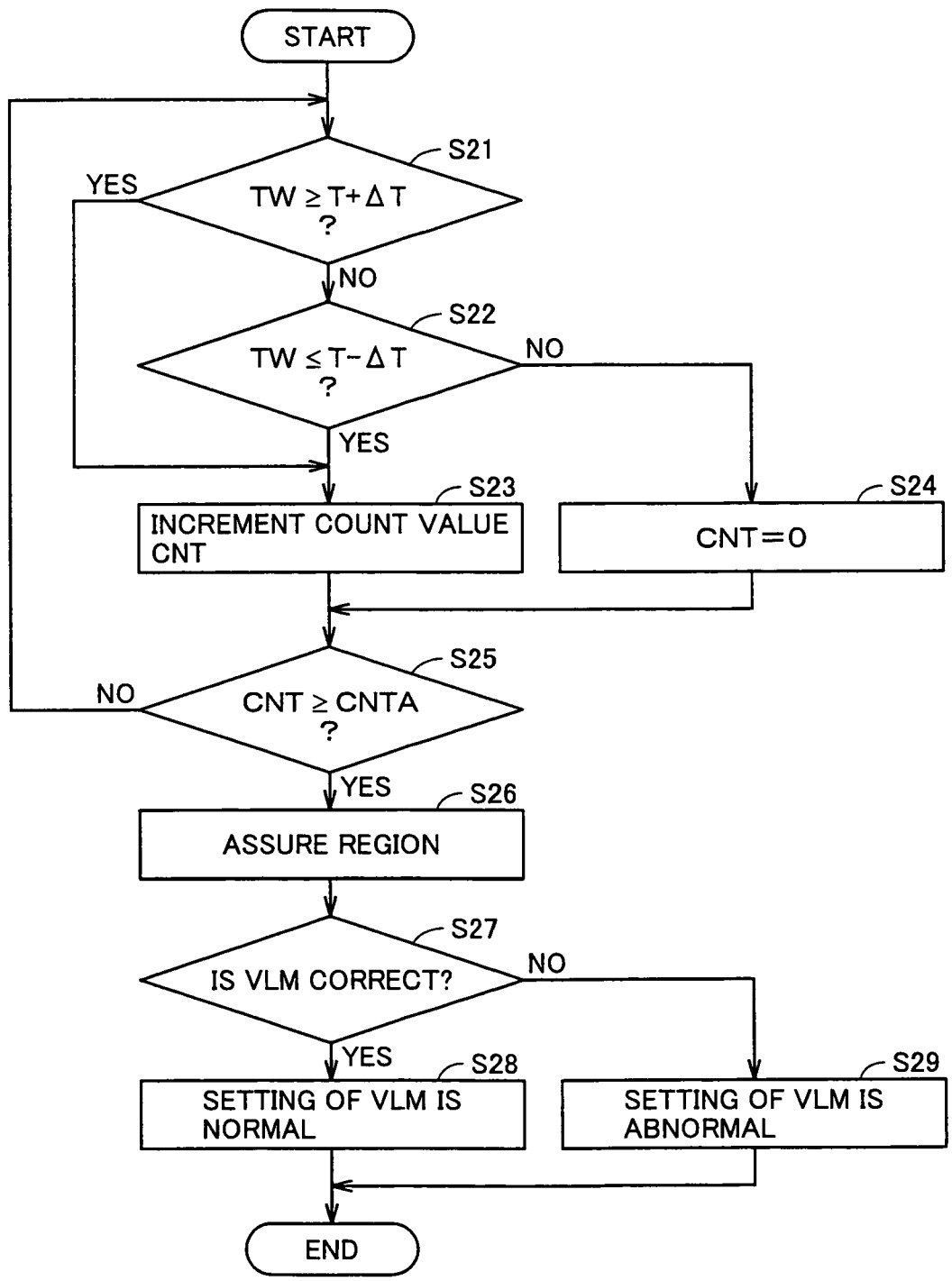
FIG. 14 is a flowchart illustrating the confirmation processing of the setting of upper limit value VLM executed by temperature determination unit 76A.

FIG. 14 is a flowchart illustrating the confirmation processing of the setting of upper limit value VLM executed by temperature determination unit 76A.

Referring to FIGS. 14 and 12, temperature determination unit 76A determines whether or not temperature value TW is $(T+\Delta T)$ or greater, that is, temperature value TW falls in region A2 (step S21). If temperature value TW is $(T+\Delta T)$ or greater (YES in step S21), temperature determination unit 76A sends instruction UP to counter 76B, which then increments count value CNT by +1 (step S23). In contrast, if temperature value TW is smaller than $(T+\Delta T)$ (NO in step S21), temperature determination unit 76A determines whether or not temperature value TW is $(T-\Delta T)$ or smaller, that is, temperature value TW falls in region A1 (step S22).

If temperature value TW is $(T-\Delta T)$ or smaller (YES in step S22), temperature determination unit 76A increments count value CNT by +1 (step S23). In contrast, if temperature value TW is greater than $(T-\Delta T)$ (NO in step S22), temperature determination unit 76A sends instruction CLR to counter 76B, which then clears count value CNT to 0 (step S24).

Subsequently, temperature determination unit 76A determines whether or not count value CNT is a predetermined value CNTA or greater (step S25). If count value CNT is predetermined value CNTA or greater (YES in step S25), temperature determination unit 76A assures a region in which temperature value TW falls (step S26). In contrast, if count value CNT is smaller than predetermined value CNTA (NO in step S25), the entire control routine returns to step S21.

When temperature value TW is stable, a state in which temperature value TW falls in either one of regions A1 and A2 is continued for a predetermined period of time or longer, and therefore, count value CNT becomes predetermined value CNTA or greater. In contrast, if temperature value TW is fluctuated, count value CNT returns to 0 or becomes smaller than predetermined value CNTA, and therefore, the processings in steps S21 to S25 are repeated.

In step S26, the region in which temperature value TW falls is assured. Temperature determination unit 76A compares upper limit value VLM corresponding to the region (i.e., voltage value VC or a voltage value VD) with upper limit value VLM output from upper limit setting unit 72, to then determine whether or not upper limit value VLM is correct (step S27). In a case where these two values are equal to each other, that is, where upper limit value VLM is correct (YES in step S27), temperature determination unit 76A determines that the setting of upper limit value VLM is correct (step S28). In contrast, in a case where these two values are not equal to each other, that is, where upper limit value VLM is not correct (NO in step S27), temperature determination unit 76A determines that the setting of upper limit value VLM is abnormal (step S29). Upon completion of the processing in step S28 or step S29, the entire control routine comes to an end.

Figure 15:
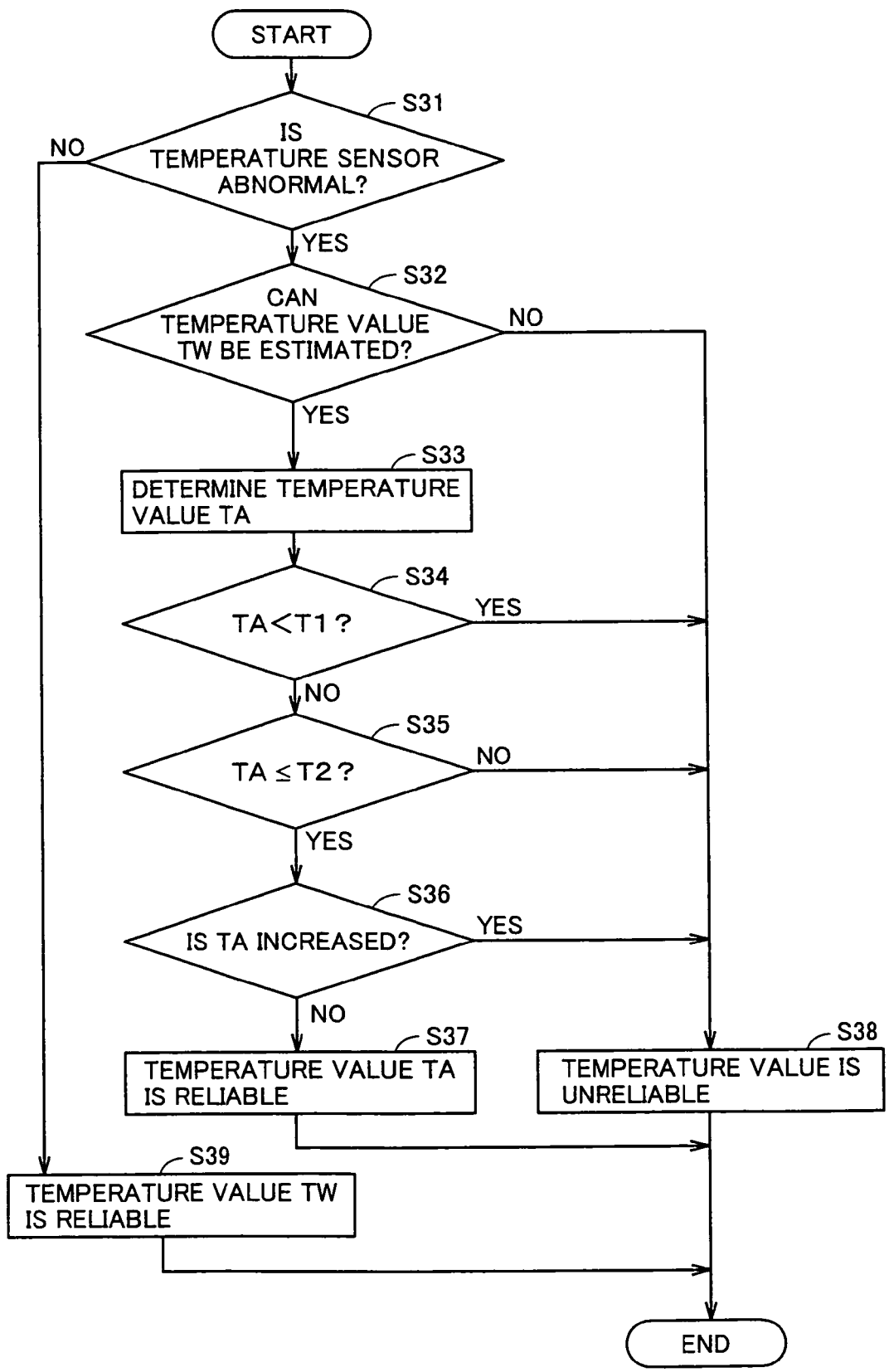
FIG. 15 is a flowchart illustrating the determination processing of reliability of temperature value TW by temperature determination unit 76A.

FIG. 15 is a flowchart illustrating a determination processing of reliability of temperature value TW by temperature determination unit 76A.

Referring to FIGS. 15 and 12, temperature determination unit 76A determines whether or not the temperature sensor is abnormal (step S31). In a case where the temperature sensor is normal (NO in step S31), temperature determination unit 76A determines that temperature value TW is reliable (step S39).

In contrast, in a case where temperature value TW cannot be input into temperature determination unit 76A due to, for example, breakage of a signal line for connecting the temperature sensor and temperature determination unit 76A to each other or in a case where temperature value TW is excessively high (or low), temperature determination unit 76A determines the temperature sensor is abnormal. In this case (YES in step S31), temperature determination unit 76A determines whether or not temperature value TW can be estimated (step S32).

In a case where the inverter is operated, it is determined that temperature estimation unit 77 can estimate temperature value TW based on drive instructions PWMI1 and PWMI2. If the temperature sensor is abnormal (YES in step S31) and temperature value TW can be estimated (YES in step S32), temperature estimation unit 77 determines temperature value TA (i.e., the estimated temperature) (step S33). If temperature value TW cannot be estimated (NO in step S32), temperature determination unit 76A determines that temperature value TW is not reliable since there is no criterion for determining the reliability of temperature value TW (step S38).

Figure 16:
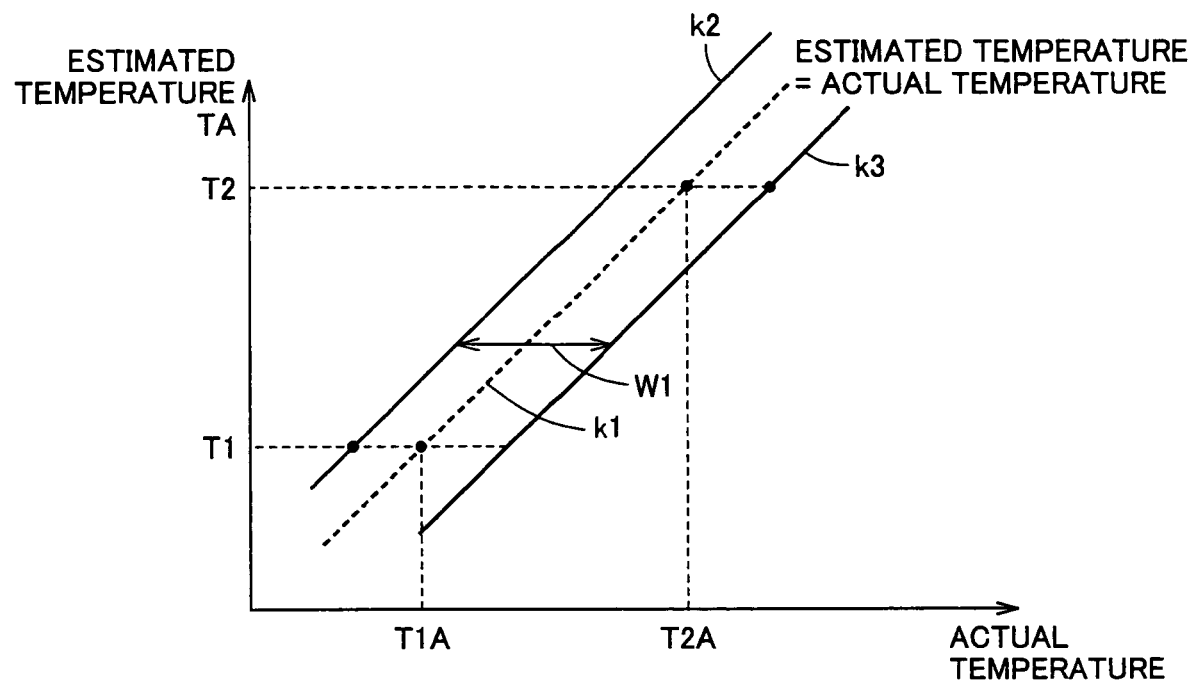
FIG. 16 is a drawing for illustrating a relationship between an actual temperature and an estimation temperature in the inverter.

Next, temperature determination unit 76A determines whether or not temperature value TA is a temperature value T1 illustrated in FIG. 16 or lower (step S34).

Here, with reference to FIG. 16, a straight line k1 indicates that the actual temperature and estimated temperature (i.e., temperature value TA) of the inverter are equal to each other. A width W1 indicates a range in which predetermined estimation accuracy with respect to a given actual temperature can be secured. Another straight line k2 indicates a lower limit of the range whereas a further straight line k3 indicates an upper limit of the range. That is to say, temperature value T1 signifies a lower limit value of a temperature range (having width W1) in which the predetermined estimation accuracy can be secured with respect to an actual temperature value T1A. In the meantime, a temperature value T2 signifies an upper limit value of the temperature range (having width W1) in which the predetermined estimation accuracy can be secured with respect to another actual temperature value T2A. Here, a range from temperature value T1 to temperature value T2 indicates a range in which the temperature of the inverter can be estimated.

Referring to FIGS. 15 and 16, in a case where temperature value TA is lower than temperature value T1 (YES in step S34), there is no criterion for determining the reliability of temperature value TW (step S38) since the estimation accuracy of temperature value TA cannot be secured. As a consequence, temperature determination unit 76A determines that neither of temperature values TW and TA are reliable (step S38). In a case where temperature value TA is equal to temperature value T1 or higher (NO in step S34), it is determined whether or not temperature value TA is temperature value T2 or lower (step S35).

In a case where temperature value TA is higher than temperature value T2 (NO in step S35), temperature determination unit 76A determines that neither of temperature values TW and TA are reliable (step S38) since there is no criterion for determining the reliability of temperature value TW, like in a case where temperature value TA is lower than temperature value T1. If temperature value TA is equal to temperature value T2 or lower (YES in step S35), temperature determination unit 76A determines whether or not temperature value TA is increased (step S36).

Figure 17:
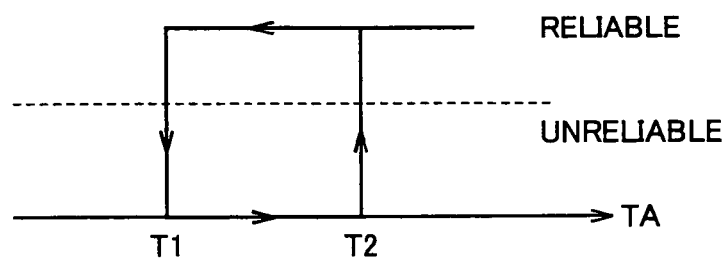
FIG. 17 is a drawing for illustrating a relationship between a temperature value TA and reliability of temperature value TA.

As illustrated in FIG. 17, when temperature value TA is increased to reach temperature value T2, temperature value TA is changed from "unreliable" to "reliable" in temperature determination unit 76A. In contrast, when temperature value TA is decreased to reach temperature value T1, temperature value TA is changed from "reliable" to "unreliable." In a case where temperature value TA is "unreliable," upper limit value VLM is fixed to voltage value VC. In contrast, if temperature value TA is "reliable," and further, if temperature value TW is high, upper limit value VLM is set to voltage value VD.

In this manner, the determination of the reliability of temperature value TA is switched, so that temperature value TA is securely assured to be either "reliable" or "unreliable" even if temperature value TA cannot be stable in a case where temperature value TA falls between temperature value T1 and temperature value T2, thereby stabilizing the operation of the inverter.

With reference to FIGS. 15 and 17, in a case where temperature value TA is increased in step S36 (YES in step S36), temperature value TA is increased and is temperature value T2 or lower, and therefore, temperature determination unit 76A determines that temperature value TA is unreliable (step S38). In contrast, in a case where temperature value TA is decreased in step S36.(NO in step S36), temperature value TA is decreased and falls between temperature values T1 and T2. In this case, temperature determination unit 76A determines that temperature value TA is reliable (step S37). Upon completion of any one of the processings in steps S37, S38 and S39, the entire control routine comes to an end.

As described above, in the third embodiment, in a case where the detection result (i.e., temperature value TW) by the temperature sensor is abnormal, control unit 30 estimates the temperature of the inverter based on the operational condition of the inverter, and then, sets upper limit value VLM by using the estimation result. As a consequence, even at the time of the abnormality of the temperature sensor, the inverter can be continuously operated within the operational temperature range of the inverter.

Moreover, control unit 30 sets upper limit value VLM by using the estimation result in a case where the estimation result falls within a predetermined temperature region (i.e., within the temperature range defined by width W1) whereas fixes upper limit value VLM in a case where the estimation result does not fall within the predetermined temperature region. Consequently, the voltage in excess of the withstand voltage of the inverter element can be prevented from being applied to the inverter.

Additionally, control unit 30 includes upper limit setting unit 72 for setting upper limit value VLM based on temperature value TW, and determination unit 76 determining, based on the relationship between temperature value TW and upper limit value VLM illustrated in FIG. 13, whether or not upper limit value VLM set by upper limit setting unit 72 is correct. Upper limit setting unit 72 fixes upper limit value VLM in a case where determination result R1 by determination unit 76 reveals that the setting of upper limit value VLM is not correct. Since upper limit value VLM at this time is set to a lowest value within the set range, the voltage in excess of the withstand voltage of the inverter element can be prevented from being applied to the inverter.

Incidentally, the present invention is applied to a series/parallel type hybrid system in which the power of the engine can be transmitted to both of a vehicular axle and a power generator by a power distributing mechanism in the embodiments. However, the present invention may be applied to a series type hybrid automobile in which an engine is used only for driving a power generator, and then, only a motor using electric power generated by the power generator produces driving force for a vehicular axle, or an electric automobile which travels only by a motor.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A control apparatus for a load device including an inverter having a switching element, comprising:
a temperature detection unit to detect a temperature of said inverter;
a voltage detection unit to detect an applied voltage of said inverter; and
a control unit to operate said inverter in a case where said applied voltage is a predetermined upper limit value or lower whereas to stop said inverter in a case where said applied voltage is higher than said upper limit value based on a voltage detection result by said voltage detection unit,
said control unit setting said upper limit value based on a temperature detection result by said temperature detection unit in consideration of temperature dependency of a withstand voltage of said switching element, wherein as the withstand voltage increases with an increase in the temperature of the inverter, the upper limit value is increased.

2. The control apparatus for a load device according to claim 1, wherein said load device further includes a step-up circuit that steps up a DC voltage from a DC power source, so as to apply said DC voltage stepped up in said inverter as said applied voltage, and
said control unit controls said step-up circuit such that said applied voltage becomes said upper limit value or lower.

3. The control apparatus for a load device according to claim 2, wherein said load device further includes a rotating electric machine to be connected to said inverter, and
said control unit controls said inverter such that a load of said rotating electric machine is restricted in a case where the temperature of said inverter is higher than a predetermined value.

4. The control apparatus for a load device according to claim 1, wherein said control unit sets said upper limit value by using a temperature estimation result in said inverter based on the operational status of said inverter in a case where said temperature detection result by said temperature detection unit is abnormal.

5. The control apparatus for a load device according to claim 4, wherein said control unit sets said upper limit value by using said temperature estimation result in a case where said temperature estimation result falls within a predetermined temperature region whereas said control unit fixes said upper limit value in a case where said temperature estimation result does not fall within said predetermined temperature region.

6. The control apparatus for a load device according to claim 1, wherein said control unit includes:
- a setting unit to set said upper limit value based on said temperature detection result by said temperature detection unit; and
- a determination unit to determine whether or not said upper limit value set by said setting unit is correct based on said temperature detection result by said temperature detection unit and a predetermined relationship between the temperature of said inverter and said upper limit value, and
- said setting unit fixes said upper limit value in a case where a determination result by said determination unit reveals that the setting of said upper limit value is not correct.

7. A vehicle comprising:
- a load device including an inverter that provides power to the vehicle, the inverter having a switching element; and
- a control apparatus for said load device, including
- a temperature detection unit to detect a temperature of said inverter;
- a voltage detection unit to detect an applied voltage of said inverter; and
- a control unit to operate said inverter in a case where said applied voltage is a predetermined upper limit value or lower whereas to stop said inverter in a case where said applied voltage is higher than said upper limit value based on a voltage detection result by said voltage detection unit;
- said control unit setting said upper limit value based on a temperature detection result by said temperature detection unit in consideration of temperature dependency of a withstand voltage of said switching element, wherein as the withstand voltage increases with an increase in the temperature of the inverter, the upper limit value is increased.

8. The vehicle according to claim 7, wherein said load device further includes a step-up circuit that steps up a DC voltage from a DC power source, so as to apply said DC voltage stepped up in said inverter as said applied voltage, and
said control unit controls said step-up circuit such that said applied voltage becomes said upper limit value or lower.

9. The vehicle according to claim 8, wherein said load device further includes a rotating electric machine to be connected to said inverter, and
said control unit controls said inverter such that a load of said rotating electric machine is restricted in a case where the temperature of said inverter is higher than a predetermined value.

10. The vehicle according to claim 7, wherein said control unit sets said upper limit value by using a temperature estimation result in said inverter based on the operational status of said inverter in a case where said temperature detection result by said temperature detection unit is abnormal.

11. The vehicle according to claim 10, wherein said control unit sets said upper limit value by using of said temperature estimation result in a case where said temperature estimation result falls within a predetermined temperature region whereas said control unit fixes said upper limit value in a case where said temperature estimation result does not fall within said predetermined temperature region.

12. The vehicle according to claim 7, wherein said control unit includes:
- a setting unit to set said upper limit value based on said temperature detection result by said temperature detection unit; and
- a determination unit to determine whether or not said upper limit value set by said setting unit is correct based on said temperature detection result by said temperature detection unit and a predetermined relationship between the temperature of said inverter and said upper limit value, and
- said setting unit fixes said upper limit value in a case where a determination result by said determination unit reveals that the setting of said upper limit value is not correct.

* * * * *